June 25, 1963    S. T. MORELAND    3,095,018
FILLER ASSEMBLY FOR PULVERULENT MATERIALS
Filed Dec. 28, 1959     3 Sheets-Sheet 1

INVENTOR
STEPHEN T. MORELAND
BY
ATTORNEYS

June 25, 1963 S. T. MORELAND 3,095,018
FILLER ASSEMBLY FOR PULVERULENT MATERIALS
Filed Dec. 28, 1959 3 Sheets-Sheet 2
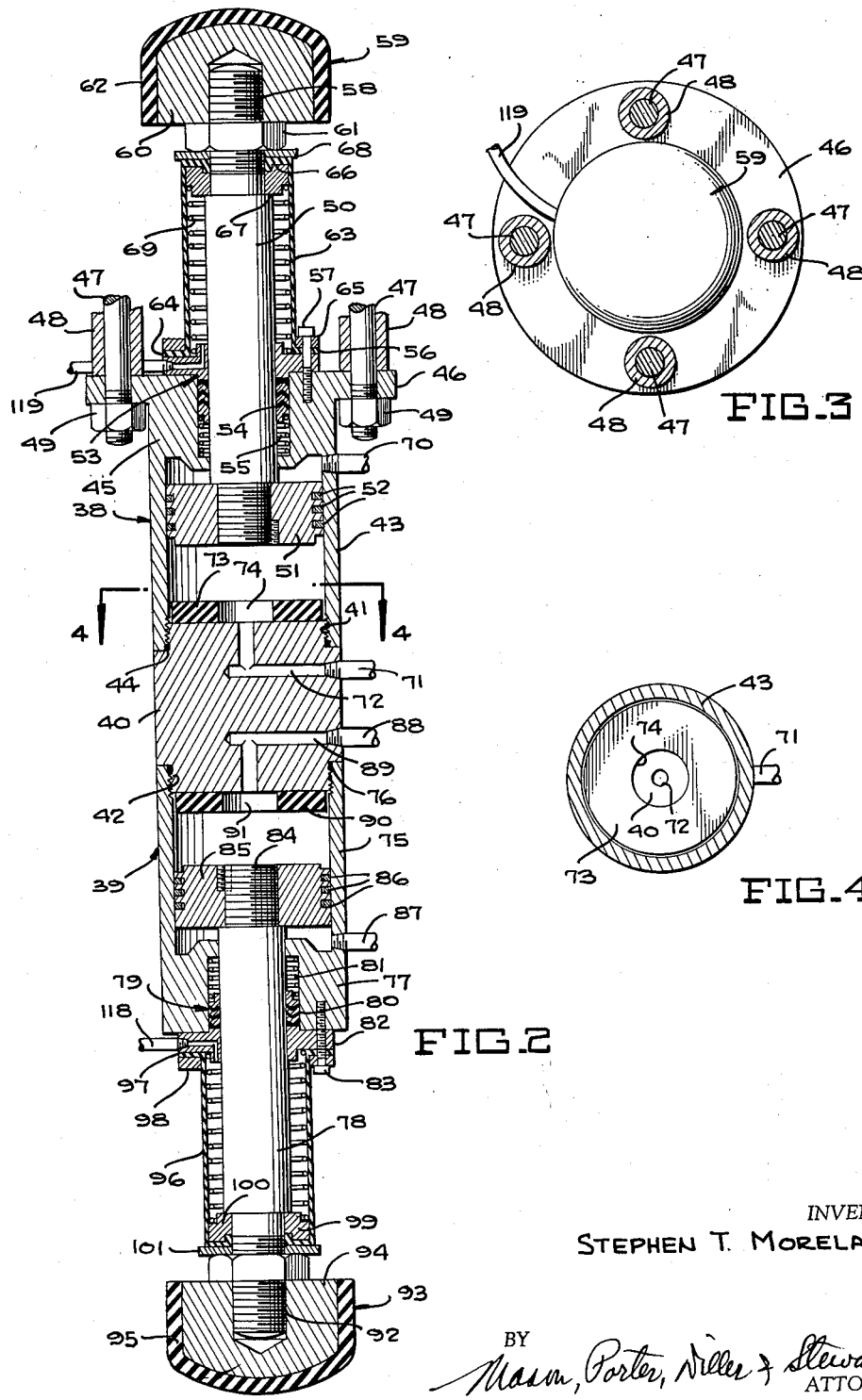
INVENTOR
STEPHEN T. MORELAND
BY
ATTORNEYS June 25, 1963  S. T. MORELAND  3,095,018
FILLER ASSEMBLY FOR PULVERULENT MATERIALS
Filed Dec. 28, 1959  3 Sheets-Sheet 3
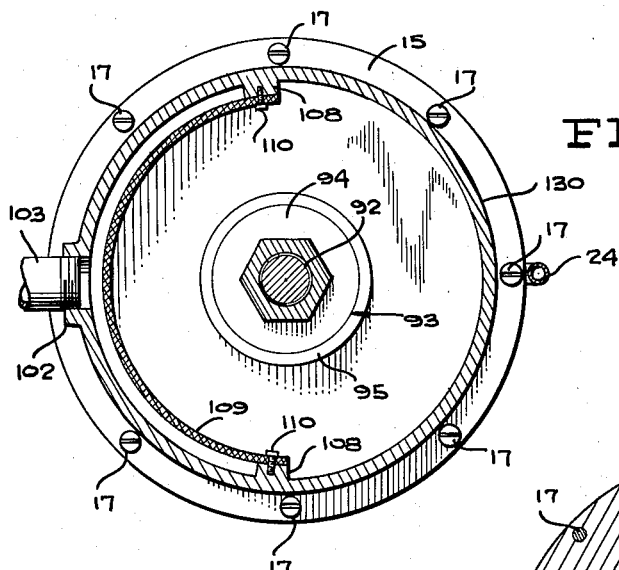
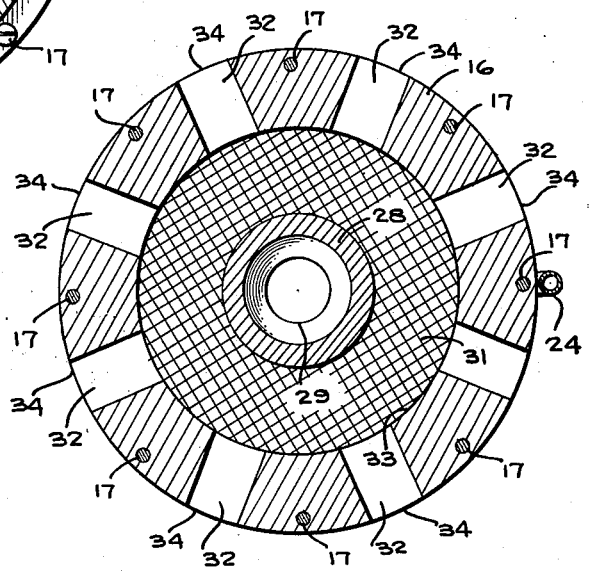
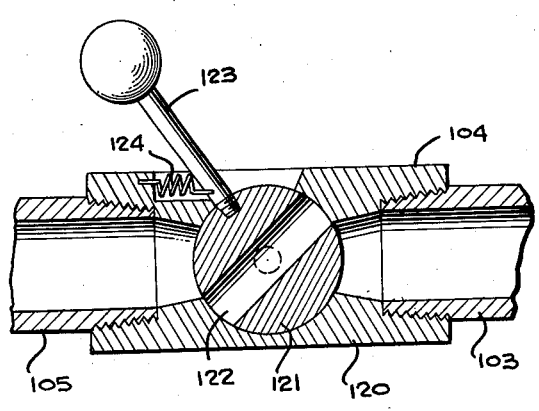
INVENTOR
STEPHEN T. MORELAND though # United States Patent Office 3,095,018
Patented June 25, 1963

3,095,018
FILLER ASSEMBLY FOR PULVERULENT
MATERIALS
Stephen T. Moreland, Chicago, Ill., assignor to Continental Can Company, New York, N.Y., a corporation of New York
Filed Dec. 28, 1959, Ser. No. 862,203
4 Claims. (Cl. 141—67)

This invention relates in general to new and useful improvements in valve assemblies, and more particularly relates to a new and useful filler valve for use in conjunction with pulverulent materials.

Heretofore, the controlling of the flow of pulverulent materials through filling nozzles has presented a problem. Two different types of valve structures have been primarily attempted, without success. These include a pinch-off valve which consists of a rubber tube through which the pulverulent material flows to the nozzle, and a steel plunger, which is air operated and stops the flow of material to the nozzle, when actuated, by bringing the walls of the rubber tube together. This valve assembly does not function satisfactorily for the reason that powder is entrapped between the walls of the rubber tube, when the steel plunger is trying to bring the walls together, and thus air or gas and powdered material are caused to leak out of the reservoir, which is under pressure constantly during the non-filling part of the cycle.

The second form of valve heretofore used is a simple ball valve, similar to the commonly used valves for controlling flow of liquids. This type of valve fails to function satisfactorily for the reason that the powdery materials, most of which are abrasive, are carried onto the valve seat surfaces, into which they are embedded when pressure is exerted. The abrasive action of these powdery materials, which are now embedded in the valve seat, erodes or abrades the surface of the ball, thus causing leakage of air or gas and of powder from the pressurized reservoir during the non-filling part of the filling cycle.

In accordance with the invention, it is proposed to provide a filler valve for use with pulverulent materials, which filler valve, while being subject to the abrasive material, continues to function and provides an effective seal during the non-filling part of the cycle for the filler valve.

Another object of the invention is to provide a valve assembly which may properly function within a closed chamber having abrasive material passing therethrough, the chamber being alternatively subjected to subatmospheric and higher pressures, the valve assembly including a valve rod and a valve member, the valve rod being protected by a boot which encases the same, and the boot having communication with the interior thereof an air line which is selectively connected to a subatmospheric pressure source and a higher pressure source, whereby the pressures interiorly and exteriorly on the boot are equalized.

Another object of the invention is to provide a novel filler for filling containers with pulverulent materials and the like from a supply hopper, the filler including a chamber which may be a metering chamber, which chamber is provided at the upper end thereof with an inlet opening and at the lower end thereof with a discharge opening, valve means controlling the flow of material through the inlet and discharge openings, and means for selectively evacuating and pressurizing the chamber, whereby the chamber may be first evacuated, after which the material which is to be placed within a container during a filling operation is permitted to flow into the chamber, after which the chamber is again sealed and then pressurized by introduction of air under pressure into the chamber, after which the discharge opening is finally uncovered and the materials within the chamber forced into the container to be filled under air pressure.

A further object of this invention is to provide a novel valve assembly which is resistant to abrasion, the valve assembly including a valve seat presenting a continuous corner surface, and a valve member having a resilient abrasion resistive covering, the covering, when engaging the valve seat, resiliently deforming inwardly and thereby assuring a positive seal.

A further object of the invention is to provide a novel filler assembly to be placed intermediate a supply hopper and a container to be filled, the filler assembly including an elongated chamber having a top wall adapted to be secured to the supply hopper, and a bottom wall, the top wall having an inlet opening therein and the bottom wall having a discharge opening, a pair of valve assemblies mounted within the chamber in back-to-back aligned relation for independently closing the inlet opening and the discharge opening, the bottom wall carrying on the underside thereof a sealing ring to form a seal with the container to be filled, and the bottom wall having vent openings for venting the container as it is being filled, the chamber being provided with air lines which are connected to a subatmospheric pressure source and a higher pressure source, whereby the chamber may be selectively evacuated and pressurized, and each of the valve assemblies including a valve member and a valve rod, the valve member including a head having a resilient abrasion resistant covering, and the valve rod being protected by an abrasion resistant boot, the interior of each boot being connected to the air lines for equalizing the pressures on the interior and exterior of each boot during the evacuation and pressurizing of the chamber, whereby the boot is not subjected to any undesired pressures.

With the above, and other objects in view that will hereinafter appear, the nature of the invention will be more clearly understood by reference to the following detailed description, the appended claims, and the several views illustrated in the accompanying drawings.

In the drawings:

FIGURE 2 is an enlarged vertical sectional view, taken through the two valve assemblies for controlling flow through an inlet opening and a discharge opening of the filler assembly.

FIGURE 3 is a top plan view of the valve assembly of FIGURE 2, with the supports therefor shown in section.

FIGURE 4 is a transverse horizontal sectional view, taken along the section line 4—4 of FIGURE 2, and shows the internal construction of the valve assembly.

FIGURE 5 is a horizontal sectional view, taken along the section line 5—5 of FIGURE 1, and shows the construction of the filler assembly in the area of one of the air line connections to the chamber thereof.

FIGURE 6 is a horizontal sectional view, taken along the section line 6—6 of FIGURE 1, and shows the specific details of the bottom plate and the container vent openings formed therein.

FIGURE 7 is an enlarged fragmentary vertical sectional view taken through a typical valve assembly for controlling the pressure within the chamber.

Figure 1:
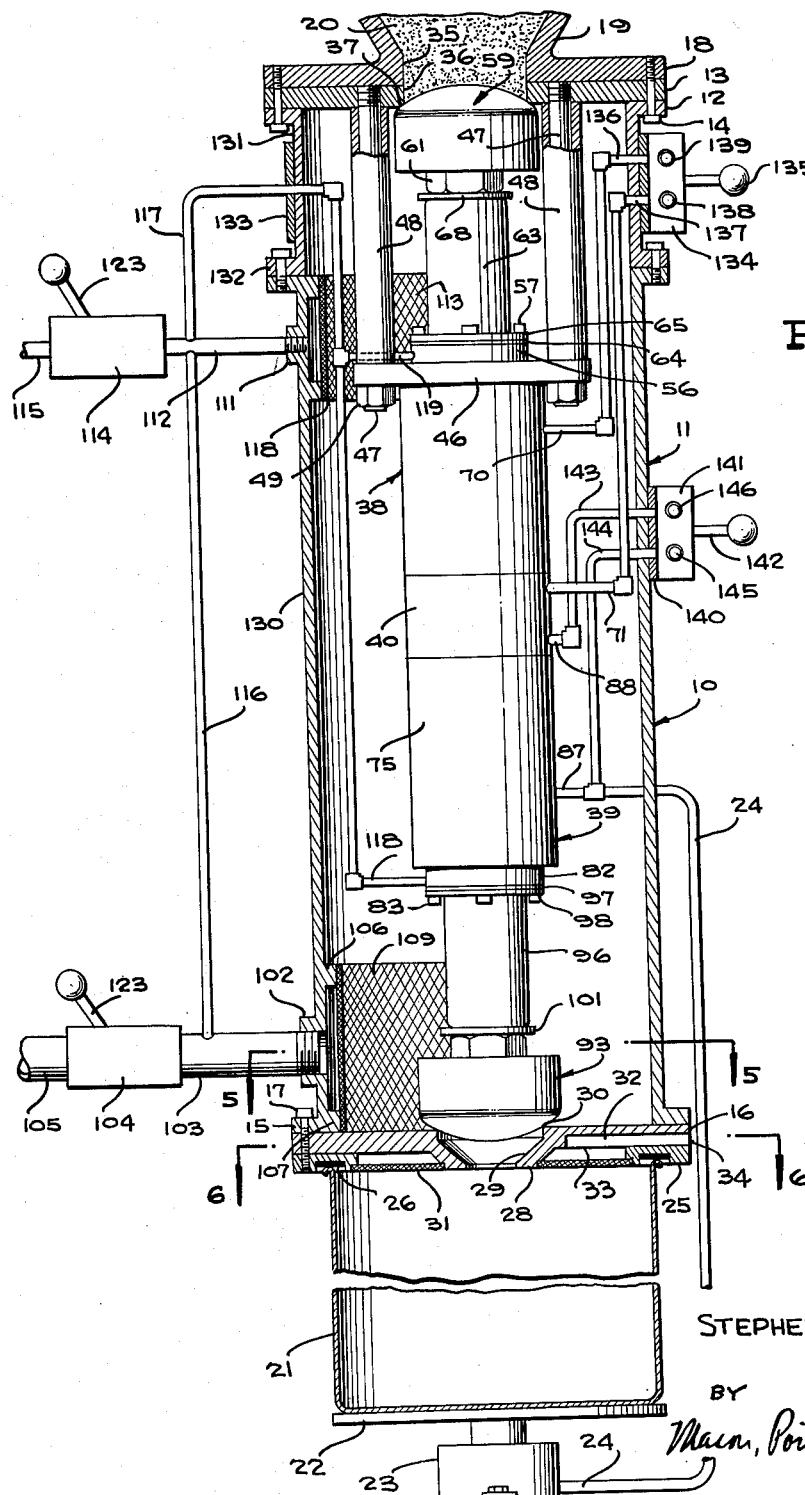
FIGURE 1 is a vertical sectional view taken through the filler assembly, and shows the general connections thereof with both a supply hopper and a container to be filled.

Referring now to the drawings in particular, it will be seen that an example embodiment of the filler assembly is generally referred to by the numeral 10. The filler assembly 10 includes an elongated cylindrical chamber 11 which is provided at the upper end thereof with an outwardly directed annular flange 12 to which a top wall 13 is secured by means of fasteners 14. The lower end of the chamber 11 is also provided with an outwardly directed annular flange 15 to which a bottom wall 16 is secured by means of a plurality of circumferentially spaced fasteners 17. The fasteners 14 also serve to secure the chamber 11 to the underside of a mounting flange 18 of a hopper or other type of reservoir 19, the hopper 19 normally having stored therein a pulverulent material 20, although other materials, including liquids and semi-liquids may be stored within the hopper 19.

The filler assembly 10 may be suspended from the hopper 19 by the fasteners 14, or may be provided with external supports (not shown). The specific mounting of the filler assembly 10 is not a part of this invention.

The filler assembly 10 is intended to be used in filling relatively large containers, such as the drum type container 21 illustrated in the lower part of FIGURE 1. In order to accomplish the filling of such a container with ease, a support 22 is positioned in alignment with the lower part of the chamber 11, and is carried by a vertically extensible fluid motor 23 having a fluid line 24 connected thereto. The fluid motor 23 may be controlled in any manner desired.

It is intended that the container 21 be sealed during the filling thereof. Accordingly, an adapter ring 25 is secured to the underside of the bottom wall 16, the adapter ring 25 being held in place by the fasteners 17. The adapter ring 25 carries a downwardly facing sealing ring 26 which is adapted to engage the upper edge of the container 21 and form a seal therewith. The support 22 is moved upwardly to force the container 21 into engagement with the sealing ring 26 to accomplish the desired seal.

It is to be noted that the bottom wall 16 is provided with a centrally located, downwardly projecting portion 28 which terminates at the lower end thereof coplanar with the adapter ring 25. The portion 28 defines a generally funnel-shaped discharge opening 29 and an upper annular valve seat 30, the annular valve seat 30 being in the form of a corner surface, as is best illustrated in FIGURE 1.

The space between the portion 28 of the bottom wall 16 and the adapter ring 25 is closed by an annular screen 31. The screen 31 may be considered a filter in that its purpose is to permit air to escape from the container 21 during a filling operation, and at the same time, to prevent the passage of the pulverulent or other material which is being placed into the container 21. The bottom wall 16 is provided with a plurality of radiating vent passages 32 above the screen 31, and having entrance openings overlying the screen 31, the entrance openings being referred to by the numeral 33. As is best illustrated in FIGURE 6, the vent opening 33 is of annular configuration. Each of the vent passages 32 also has an individual discharge opening 34 which opens through the periphery of the bottom wall 16, this being equally as well illustrated in FIGURES 1 and 6.

As is best illustrated at the top of FIGURE 1, the hopper 19 is provided with a discharge opening 35 which is aligned with an inlet opening 36 formed in the top wall 13. The inlet opening 36 terminates in a lower valve seat 37 which is in the form of an annular corner, thus presenting a relatively sharp sealing edge.

An inlet valve, generally referred to by the numeral 38, controls the opening and closing of the inlet opening 36, and a discharge valve, generally referred to by the numeral 39, controls the opening and closing of the discharge opening 29. The valves 38 and 39 are mounted in alignment and in back-to-back relation. The details of these valves are best illustrated in FIGURE 2.

The valves 38 and 39 are connected together by a central block 40. The block 40 has a reduced externally threaded upwardly projecting portion 41, and a similar reduced externally threaded downwardly projecting portion 42. The valve 38 includes a cylinder 43 which is threaded onto the portion 41 and is sealed relative to the block 40 by a sealing ring 44. The cylinder 43 is provided with an integral head 45 which includes an outwardly projecting annular flange 46. Suspension bolts 47, which have their upper ends threaded into the top wall 13, extend down and pass through the flange 46. Each extension bolt 47 carries a spacing sleeve 48 which extends between the underside of the top wall 13 and the upper surface of the flange 46. Each of the bolts 47 also has a clamping nut 49. Thus, the bolts 47 serve to suspend the valves 38 and 39 within the chamber 11 from the top wall 13 thereof.

The valve 38 also includes a piston rod 50 which opens through the head 45 and on the lower end of which piston rod 50 a piston 51 is threadedly engaged. The piston 51 is positioned within the cylinder 43 and is provided with suitable rings 52 for forming a seal with the cylinder 43.

The head 45 is provided with a seal assembly, generally referred to by the numeral 53, for sealing the rod 50 with respect to the head 45. The seal assembly 53 includes suitable packing rings 54 which are spring urged outwardly by a spring 55 and which are retained in place by a cover plate 56 which is secured to the head 45 by fasteners 57.

The rod 50, which functions both as a piston rod and a valve rod, is provided with a reduced threaded upper end 58 on which a valve member, generally referred to by the numeral 59, is positioned. The valve member 59 includes a valve head 60 which is threaded onto the upper part of the rod end 58 and is locked in place by a lock nut 61. The valve head 60 has a resilient covering 62 which is formed of rubber or a rubberlike material, which material will be resistant to abrasion. It is to be noted that when the covering 62 engages the valve seat 37, due to the sharp corner of the valve seat 37, the covering 62 will deform and form the required seal.

In order that the rod 50 may be protected against the abrasive materials which are to be handled by the filling assembly 10, a boot 63 encases the rod 50. The boot 63 is formed of a rubber or rubberlike material which is also resistant to abrasion. The lower end of the boot 63 terminates in a mounting flange 64 which is clamped between the cover plate 36 and a clamp ring 65, the clamp ring being carried by the fasteners 57.

The upper end of the boot 63 terminates in an inwardly directed flange 66 which abuts the lower part of the end 58. The flange 66 is clamped between a pair of clamp plates 67 and 68 carried by the end 58 of the rod 50. The boot 63 is normally supported against collapse by an internally disposed reinforcing member 69 which is in the form of a coiled length of wire, the reinforcing member 69 being centered by projecting portions of the cover plate 56 and the clamp plate 67.

An air pipe or a hydraulic fluid pipe, as the case may be, is carried by the cylinder 43 above the uppermost position of the piston 51. The pipe is referred to by the numeral 70. A similar pipe 71 is connected to the block 40 and opens into a passage 72 which, in turn, opens into the lower part of the cylinder 43 through the block 40. At this time, it is also pointed out that a buffer plate 73 is mounted within the cylinder 43 for engagement by the piston 51 as it is moved downwardly. The buffer plate 73 is supported by the block 40 and has a large opening 74 therethrough through which fluid passing through the passage 72 may enter into the cylinder 43 for action on the piston 51.

The valve 39 is very similar to the valve 38, and includes a cylinder 75 which is threadedly engaged on the portion 42 and is sealed with respect to the block 40 by means of a sealing ring 76. The cylinder 75 is also provided with an integral head 77, the head 77 differing from the head 45 in that it is not provided with a flange, such as the flange 46. The valve 39 also includes a rod 78 which functions both as a piston rod and a valve rod. The rod 78 passes through the head 77 and is sealed relative to the head 77 by a sealing unit 79 which includes suitable packing rings 80 which are spring urged by a spring 81 and which are retained in place by a cover plate 82, the cover plate being secured to the head 77 by suitable fasteners 83.

The rod 78 is provided with a reduced threaded upper end 84 on which a piston 85 is disposed. The piston 85 is positioned within the cylinder 75 and is provided with piston rings 86 which seal with the interior surface of the cylinder 78. The cylinder 75 is provided with a pipe 87 which opens into the cylinder 75 below the piston 85. A similar pipe 88 opens into the block 40 in communication with a passage 89 which opens down into the upper end of the cylinder 75. A buffer plate 90 is disposed in the upper part of the cylinder 75 and has an enlarged opening 91 through which the passage 89 opens into the cylinder 75. The buffer plate 90 is formed of a resilient material, and serves as a buffer against the upward movement of the piston 85.

The rod 80 also includes a threaded lower end 92 on which a valve member, generally referred to by the numeral 93, is mounted. The valve member 93 includes a valve head 94 which is secured directly to the rod 78, and a resilient covering 95. The covering 95 is preferably formed of a rubber or rubberlike material which is resistant to abrasion. When the resilient covering 95 engages the valve seat 30, the resilient material of the covering 95 will resiliently deform to form the required seal.

In order to protect the rod 78 against abrasive action, it is encased within a boot 96 which is also formed of a resilient abrasive resistant material, preferably of a rubber or rubberlike product. The upper end of the boot 96 is provided with an outwardly directed annular mounting flange 97 which is clamped between the cover plate 82 and a clamping plate 98, the clamping plate 98 being held in place by the fasteners 83. The lower end of the boot 96 is provided with an inwardly directed mounting flange 99 which is clamped between a pair of clamp plates 100 and 101 which are carried by the lower end 92 of the rod 78. Referring once again to FIGURE 1 in particular, it will be seen that the lower part of the chamber 11 is provided with a fitting 102 into which a pipe 103 is threaded, the pipe 103 opening into the interior of the chamber 11. The pipe 103 is connected to a valve 104 which, in turn, is connected to a pipe 105. The pipe 105 is connected to a vacuum pump or other type of subatmospheric pressure source (not shown). The inner part of the chamber 11 is provided with a pair of vertically spaced inwardly projecting portions 106 and 107 which terminate in vertical projections 108. This is best illustrated in FIGURES 1 and 5. A screen 109 is suitably secured to the projecting portions 106, 107 and 108 by fasteners 110. The screen 109 may be of any construction, but is preferably of the type which will function as a filter, thus permitting the flow of air therethrough and at the same time, preventing the flow of the material to be handled by the filling assembly 10.

The upper part of the chamber 11 is also provided with a fitting 111, to which a pipe 112 is connected. The pipe 112 is communicated with the interior of the chamber 11, and a screen 113 overlies the inner surface of the chamber 11 in the vicinity of the fitting 111. It is to be understood that the screen 113 is of the filter type, and is both similar to the screen 109 and is mounted in the same manner. The pipe 112 is connected to a valve 114 which, in turn, is connected to a pipe 115.

A pressure equalizing pipe 116 extends between the pipes 103 and 112. The pressure equalizing pipe 116 also has an extension 117 which extends from the pipe 112 into the chamber 11 through an upper part thereof. The extension 117 extends down into the chamber 11 alongside the valves 38 and 39. The extension 117 terminates at its lower end in a pipe 118 which opens into the interior of the boot 96 through the cover plate 82, in the manner best illustrated in FIGURE 2. Another pipe 119 extends from an intermediate part of the extension 117 into the boot 63 through the cover plate 56, in the manner best illustrated in FIGURE 2.

From the foregoing, it will be apparent that when the valve 104 is opened, and the valve 114 is closed, the interior of the chamber 11 will be evacuated through the pipe 103. Thus, a subatmospheric pressure will exist within the chamber 11, and on the exterior of the boots 63 and 96. In order to equalize the pressures interiorly and exteriorly on the boots 63 and 96, the opening of the valve 104, through the pipe 116 and the extension 117, will also result in the evacuation of air from within the boots 63 and 96. On the other hand, when the valve 114 is opened and the valve 104 is closed, the interior of the chamber 11 will be pressurized through the pipe 112. A certain amount of air will flow down through the pipe 116 and into the chamber 11 through the pipe 103 in a manner to be described hereinafter. Furthermore, the extension 117 will serve to pressurize the interiors of the boots 63 and 96 to equalize the interior and exterior pressures thereon.

A typical valve assembly is illustrated in FIGURE 7. The valve assembly is considered to be the valve 104, although it may equally as well be the valve 114. The valve 104 includes a housing 120 into the opposite ends of which the pipes 103 and 105 open. A transverse valve member 121 is supported within the housing 120 for rotation. The transverse valve member 121 is provided with a flow passage 122 which is normally out of alignment with the pipes 103 and 105, and is movable into alignment therewith to permit flow through the pipes 103 and 105. The valve member 121 is actuated by means of an operator 123 to move it to an open position. A spring 124 which extends between the housing 120 and the operator 123 normally retains the valve member 121 in a closed position.

At this time, it is pointed out that it has been deemed feasible to form the chamber 11 into two sections. These sections include a lower section 130 and an upper section 131. The sections 130 and 131 are secured together by means of a flanged coupling 132. It is to be noted that the upper section 131 is relatively short as compared to the lower section 130. The upper section 131 is provided with an adapter ring 133 which permits the sealed passage of the pipe extension 117 therethrough.

The adapter ring 133 also supports a four-way valve 134 which is of a conventional spring-loaded type and which is provided with an actuator 135 for moving it to the desired positions. The valve 134 includes a pair of pipes 136 and 137 which extend through the adapter ring 135 and which are connected to the pipes 70 and 71, respectively. The valve 134 also includes a supply pipe 138 and a return pipe 139. In the event valve 134 is air operated, the return pipe 139 may be in the form of a vent.

The lower section 130 of the chamber 11 is provided with an adapter plate 140 which supports a second four-way valve 141, the four-way valve 141 being identical with the four-way valve 134 and being provided with an actuator 142. The four-way valve 141 has a pair of pipes 143 and 144 connected thereto and extending into the chamber 10 through the adapter plate 140. The pipe 143 is connected to the pipe 88 and the pipe 144 is connected to the pipe 87. The valve 141 also includes a supply pipe 145 and a return pipe 146. As in the case of the valve 134, if the valve is of the air actuated type, the return pipe 146 may be in the form of a vent or exhaust.

It is to be noted that the air line 24 for the fluid motor 23 is connected to the pipe 144. Thus, when the piston 85 is moved upwardly, the support 22 will simultaneously be moved upwardly.

Although a separate adapter plate 140 has been illustrated, it is to be understood that if the space requirements are sufficient, the valve 141 may be mounted on the adapter ring 133. However, for convenience of illustration, the separate adapter plate 140 has been illustrated.

*Operation*

In the operation of the filling assembly 10, a container, such as the container 21, is seated on the support 22. At this time, the container 21 may be spaced slightly below the sealing ring 26. The valve 104 is then opened, and the interior of the chamber 11 is evacuated to the desired subatmospheric pressure. Next, the valve 134 is actuated to admit pressure into the cylinder 43 above the piston 51, whereas previously pressure had been admitted beneath the piston 51 to hold the valve member 59 in a closed position. This results in the downward movement of the valve member 59 to uncover the inlet opening 36. As a result, and due to the evacuation of air from within the chamber 11, the material 20 will readily flow into the chamber 11. The evacuation of air from the chamber 11 continues until such time as the chamber 11 is filled with material 20. Then, the valve 134 is returned to its normal position with the result that the inlet opening 36 is closed. The valve 104 is now closed, and the valve 114 is opened to pressurize the interior of the chamber 11. The valve 141 has the position thereof changed so that instead of the piston 85 being urged downwardly to maintain the valve member 93 in a discharge opening closing position, the piston 85 is moved upwardly to unseat the valve member 93. At the same time, the support 22 moves upwardly to assure the movement of the container 21 into sealing engagement with the sealing ring 26. The flow of air into the chamber 11 through both the pipe 112 and the pipe 103 results in the material 20 being forced out of the chamber 11 down into the container 21. The flow of air through the pipe 103 serves to aid in the forcing of the material downwardly through the discharge opening 29. The air both initially disposed within the container 21 and passing thereinto with the material 20, is discharged through the vent openings 32 previously described. It will be readily apparent that the material passing into the container 21 is compacted and relatively free from air due to the venting of the container during the filling operation.

After the container 21 has been filled, the valve 141 is permitted to return to its normal position, at which time the valve member 93 again seats on the valve seat 30, and the support 22 moves downwardly to permit the removal of the filled container 21. The filling assembly 10 is ready for another cycle of operation after the filled container has been removed and a new container has been positioned on the support 22.

At this time, it is pointed out that several modifications are envisioned. In the first place, all of the valves 104, 114, 134 and 141 may be electrically operated through an automatic mechanism. Secondly, in lieu of one discharge opening 29 and one discharge valve 39, the chamber 11 may be provided with a plurality of discharge valves which may be either independently operated or operated by a single operator. In this manner, a number of small containers may be filled simultaneously, as opposed to the one relatively large drum-type container 21.

It is also pointed out at this time that the capacity of the chamber 11 may be substantially equal to that of the container being filled, so that the chamber 11 may function as a metering chamber. Further, while the various members 31, 109 and 113 have been described as being screen type filters, it is to be understood that they may be in the form of sintered metal filters or other filters which will perform the desired filtering operation.

From the foregoing, it will be seen that novel and advantageous provision has been made for carrying out the desired end. However, attention is again directed to the fact that variations may be made in the example apparatus disclosed herein without departing from the spirit and scope of the invention, as defined in the appended claims.

I claim:

1. A device for filling containers with materials such as pulverulent material; comprising a closed chamber having an inlet opening and a discharge opening; inlet valve means within said chamber for closing said inlet opening and separate discharge valve means within said chamber for closing said discharge opening; a vacuum line and an air pressure line connected to said chamber for reducing and increasing the pressure therein, whereby said chamber may be first evacuated, material admitted thereinto through said inlet opening, the interior of said chamber pressurized, and the material forced from said chamber through said discharge opening; each of said valve means including valve seat, a valve member engageable with said valve seat, a valve rod connected to said valve member for positioning said valve member relative to said valve seat, a boot encasing said valve rod for protecting said valve rod against abrasion, and means connected to each boot for equalizing the pressures interiorly and exteriorly of said boots under the various operating pressures within said chamber.

2. A device for filling containers with materials such as pulverulent material; comprising a closed chamber having an inlet opening and a discharge opening; inlet valve means within said chamber for closing said inlet opening and separate discharge valve means within said chamber for closing said discharge opening, a vacuum line and an air pressure line connected to said chamber for reducing and increasing the pressure therein, whereby said chamber may be first evacuated, material admitted thereinto through said inlet opening, the interior of said chamber pressurized, and the material forced from said chamber through said discharge opening; each of said valve means including a valve seat, a valve member engageable with said valve seat, a valve rod connected to said valve member for positioning said valve member relative to said valve seat, a boot encasing said valve rod for protecting said valve rod against abrasion, and a pressure equalizing line connecting the interiors of said boots with said air lines for equalizing the pressures exteriorly and interiorly of each boot under the various operating pressures within said chamber.

3. A filler assembly comprising an upright member having a top wall adapted to be connected to a material supply and a bottom wall, an intake opening in said top wall and a discharge opening in said bottom wall, intake and discharge valve means for closing said intake and discharge openings, a sealing ring carried by said bottom wall for forming a seal with a container to be filled, said bottom wall having air vent means for venting a container during the filling thereof, a vacuum line and a pressure air line connected to said member for reducing and increasing the pressure therein, whereby said member may be first evacuated, material admitted thereinto through said inlet opening, the interior of said member pressurized to a superatmospheric pressure, and material forced from said member into a container through said discharge opening, each of said valve means including a valve seat, a valve member engageable with said valve seat, a valve rod connected to said valve member for positioning said valve member relative to said valve seat, and a boot encasing said valve rod for protecting said valve rod against abrasion by material passing through said member, and means connected to each boot for equalizing the pressures interiorly and exteriorly of said boot under the various subatmospheric and superatmospheric operating pressures within said member.

4. The filler assembly of claim 3 wherein the means connected to each boot for equalizing the pressures interiorly and exteriorly of the boot includes a pressure equalizing line connecting the interiors of said boots with said vacuum line and said air pressure line.

References Cited in the file of this patent
UNITED STATES PATENTS

| | | |
|---|---|---|
| 2,138,356 | Ryan et al. | Nov. 29, 1938 |
| 2,444,703 | Jones | July 6, 1948 |
| 2,495,081 | Thomas | Jan. 17, 1950 |
| 2,642,216 | Carter | June 16, 1953 |
| 2,703,666 | Iannelli | Mar. 8, 1955 |
| 2,723,057 | Golden | Nov. 8, 1955 |
| 2,761,605 | Pahl et al. | Sept. 4, 1956 |
| 2,839,093 | McCarthy | June 17, 1958 |
| 2,879,809 | Vogt | Mar. 31, 1959 |
| 2,880,620 | Bredtschneider | Apr. 7, 1959 |
| 2,935,233 | Vogt | May 3, 1960 |